United States Patent [19]

Chapellat et al.

[11] Patent Number: 5,528,029

[45] Date of Patent: Jun. 18, 1996

[54] LOGGING METHOD AND APPARATUS USING A PAD TO MEASURE DENSITY

[75] Inventors: Hervé Chapellat, Houston, Tex.; Laurent Jammes, L'Hay les Roses, France

[73] Assignee: Schlumberger Technology Corporation, Ridgefield, Conn.

[21] Appl. No.: 501,742

[22] Filed: Jul. 12, 1995

[30]     Foreign Application Priority Data

Jul. 12, 1994 [FR] France ................................. 94 08663

[51] Int. Cl.⁶ ..................................................... G01V 5/12
[52] U.S. Cl. ........................................... 250/266; 250/265
[58] Field of Search ..................................... 250/266, 265, 250/264, 269.3

[56]                References Cited

U.S. PATENT DOCUMENTS

| 3,202,822 | 8/1965 | Kehler | 250/83.3 |
|---|---|---|---|
| 4,129,777 | 12/1978 | Wahl et al. | 250/266 |
| 4,628,202 | 12/1986 | Minette | 250/269 |
| 4,661,700 | 4/1987 | Holenka | 250/267 |
| 4,958,073 | 9/1990 | Becker et al. | 250/269 |
| 5,282,133 | 1/1994 | Watson | 364/422 |
| 5,390,115 | 2/1995 | Lase et al. | 250/266 |
| 5,459,314 | 10/1995 | Plasek | 250/266 |

FOREIGN PATENT DOCUMENTS 93 11896  10/1993  France .

OTHER PUBLICATIONS

G. L. Moake, "A New Approach to Determining Compensated Density and $P_e$ Values with a Spectral-Density Tool", *SPWLA 32nd Annual Logging Symposium*, Jun. 16-19, 1991.

*Primary Examiner*—Davis L. Willis
*Assistant Examiner*—Kiet T. Nguyen
*Attorney, Agent, or Firm*—Martin D. Hyden; Leonard W. Pojunas

[57]                ABSTRACT

A method of determining a physical parameter of geological formations having a borehole passing therethrough by using a sonde lowered down the borehole at the end of a cable and including a source of gamma radiation, a very near detector, a near detector, and a far detector, the method being characterized in that: for each energy window, a model is created characteristic of the response of each detector; a "low resolution" value of the looked-for parameter is determined which, when applied to the model, gives rise to a theoretical measurement that is substantially equal to the "low resolution" real measurement obtained by combining the measurements from all three detectors; the measurements from the two detectors nearest the source are combined to constitute a "high resolution" real measurement; and a "high resolution" value of the parameter is determined which, when applied to the model, gives rise to a theoretical value that is substantially equal to the "high resolution" real measurement, the determination being performed on the basis of the "high resolution" real measurement and of the "low resolution" value of the parameter.

20 Claims, 5 Drawing Sheets

LOGGING METHOD AND APPARATUS USING A PAD TO MEASURE DENSITY

FIELD OF THE INVENTION

The present invention relates to studying geological formations having a borehole passing therethrough, and more particularly to a logging method and to logging apparatus using a pad that is shaped to come into contact with the wall of the borehole and carrying sensors suitable for detecting photons and measuring the energies thereof for the purpose of determining the density and other characteristics of the formation, such as its photoelectric absorption factor (Pe).

BACKGROUND OF THE INVENTION

Such logging tools, commonly referred to as being of the "gamma-gamma" type, including a source of gamma rays, and at least one, and often two, gamma ray or photon detectors (e.g. of the NaI type) that are offset longitudinally from the source along the longitudinal axis of the sonde. The gamma rays emitted by the source penetrate into the formation where they are subjected to interactions, and they are detected and counted by the detectors which also measure their energies. The number of gamma particles is shown as a function of detected photon energy, and on the basis of that information, characteristics of the formation such as density and photoelectric absorption factor are calculated. Such tools are described, for example, in European patent application No. 379 813, French patent application No.93 11896 filed on Oct. 6, 1993, and in U.S. Pat. Nos. 4,958,073 and 4,661,700.

Known tools of that type usually include two detectors, namely a near detector and a far detector, which are disposed at distances from the source that are respectively equal to about 15 cm and to about 40 cm. Both detectors are of the attenuation type, i.e. the number of particles detected per unit time is in an inverse relationship with the density of the formation.

Tools are also known that are provided with a "backscattering detector" that has a so-called "non-negative" response to an increase in the density of the formation, unlike the attenuation type near and far detectors (whose response to an increase in density is negative). The backscattering detector is disposed in the immediate proximity of the source, and it is highly collimated.

U.S. Pat. No. 5,282,133 discloses a method and apparatus using a logging tool that includes a backscattering gamma detector near to the source and an attenuation detector far from the source. The data resulting from measurement is initially subjected to preprocessing in order to correct gain and noise errors, then processing is applied firstly to the logarithm of the data from the far detector and secondly to the data from the backscattering detector whereby they are subjected to compression by a main component analysis technique that generates main component vectors which are then subjected to an inverse filter in order to determine the looked-for parameters; the inverse filter is generated using a calibration data base.

In addition, the article by G. L. Moake entitled "A new approach to determining composed density and Pe values with a spectral-density tool", published in the journal S.P.W.L.A., 32nd Annual Logging Symposium, Jun. 17–19, 1991, describes a technique of processing data from a gamma ray tool having two attenuation detectors, one far from the source and the other near to the source. In that known technique, the idea is to minimize, in the least squares sense, the difference between real measurements and data calculated on the basis of a model that is intended to represent the response of the tool to given external conditions.

In general, the determination of density and of photoelectric absorption (Pe) depends on the depth of investigation (in a radial direction) and on resolution; where resolution corresponds substantially to the distance between the source and the detector. The greater the distance between the detector and the source, the greater the investigation depth but the smaller the resolution.

Furthermore, the wall of a borehole presents irregularities of shape and it is also lined with "mudcake" formed by drilling mud caked on the geological formations along the wall. Mudcake influences measurement since the emitted and detected gamma rays or photons are subjected to interactions therein, and this influence increases with increasing thickness of mudcake.

It is therefore important to benefit both from good resolution which is obtained by having a source-to-detector distance that is as short as possible, and from great investigation depth which is obtained by having a source-to-detector distance that is as long as possible. By way of example, the investigation depth lies in the range 5 cm to 12.5 cm. Resolution is mainly a function of the distance between the source and the detector.

Presently known logging tools and methods for determining density and photoelectric absorption present limitations.

It is very difficult with known tools to benefit from resolution of less than about 40 cm even under the best possible measurement conditions, namely: borehole wall of regular shape, good application of the pad, and thin layer of mudcake (less than 1.25 cm).

In other words, measurement compensation to take account of the presence of mudcake is acceptable so long as the thickness of the mudcake is small, typically less than 1.25 cm. Unfortunately, it is not unusual for its thickness to be greater than that. In addition, it is very difficult or even impossible to physically measure the thickness of the mudcake. Thus, if the thickness of the mudcake is greater than the above threshold value, then measurement error can be relatively large and the operator has no way of knowing and thus quantifying the error.

In addition, known apparatuses and methods offer low or medium resolution (about 40 cm) even when the pad is correctly applied against the wall, and when the thickness of the mudcake is small (less than 1.25 cm).

OBJECTS AND SUMMARY OF THE INVENTION

One of the objects of the invention is to provide a logging tool and a method for determining density and other physical characteristics of formations with very good resolution (less than 5 cm) when the pad is applied against the wall of the borehole and when the thickness of the mudcake is small.

Another object of the invention is to propose a tool and a method making it possible to determine density and other physical characteristics of formations with high resolution (about 20 cm) when measurement conditions are difficult or bad, for example when the pad is poorly applied and/or when the mudcake is thick (more than 2 cm thick, for example).

A further object of the invention is to provide a tool and a method that make it possible to estimate the thickness of the mudcake, which cannot be done reliably with known tools.

To this end, the invention provides a method of determining at least one parameter representative of a physical characteristic of geological formations having a borehole passing therethrough, by means of a logging tool or sonde suitable for being lowered down the borehole secured to the end of a cable, and of the type in which the formations are irradiated by a source of photons, and photons that have interacted with the formations are detected and counted as a function of their energies in a plurality of energy windows by three detectors that are longitudinally offset relative to the source, comprising a very near detector, a near detector, and a far detector, the method being characterized by the following steps:

- for each energy window, a model is created that is characteristic of the response of each detector;
- the measurements coming from the three detectors are combined to constitute a "low resolution" real measurement;
- a "low resolution" value of the looked-for parameter is determined such that, when applied to the model, it gives rise to a theoretical measurement that is equal to or substantially equal to the "low resolution" real measurement;
- the measurements from the two detectors closest to the source are combined to constitute a "high resolution" real measurement; and
- a "high resolution" value of the parameter is determined on the basis of the "high resolution" real measurement and of the value of the "low resolution" parameter, such that when the determined "high resolution" value is applied to the model, it gives rise to a theoretical value that is equal or substantially equal to the "high resolution" real measurement.

More precisely, the "low resolution" measurements are combined by calibrating the measurements infrequency by using the following steps:

- averaging the measurements coming from the very near detector over a total longitudinal distance corresponding to the distance between the source and the far detector; and
- averaging the measurements coming from the near detector over a depth corresponding to the distance between the source and the far detector.

Similarly, the "high resolution" measurements are combined by averaging "high resolution" measurements coming from the very near detector over a total longitudinal distance corresponding to the distance between the source and the near detector.

The value of each parameter, both at "low resolution" and at "high resolution" is determined by minimizing, e.g. in the least squares sense, the difference between the real measurements and the theoretical measurements calculated by applying the model to the parameter.

In a preferred embodiment, the method makes use of a backscattering detector that is very near and of two attenuation detectors that are respectively near and far.

Advantageously, the energy spectrum of the near and far detectors is subdivided into four energy windows each, while the energy spectrum of the very near detector is subdivided into three energy windows, each window preferably being weighted as a function of the measurement error associated therewith and of the error in the model.

The invention also provides apparatus for implementing the above-described method.

DESCRIPTION OF THE DRAWINGS

The invention will be well understood in the light of the following description of illustrative but non-limiting examples of the invention and given with reference to the accompanying drawings, in which.

DETAILED DESCRIPTION

Figure 1:
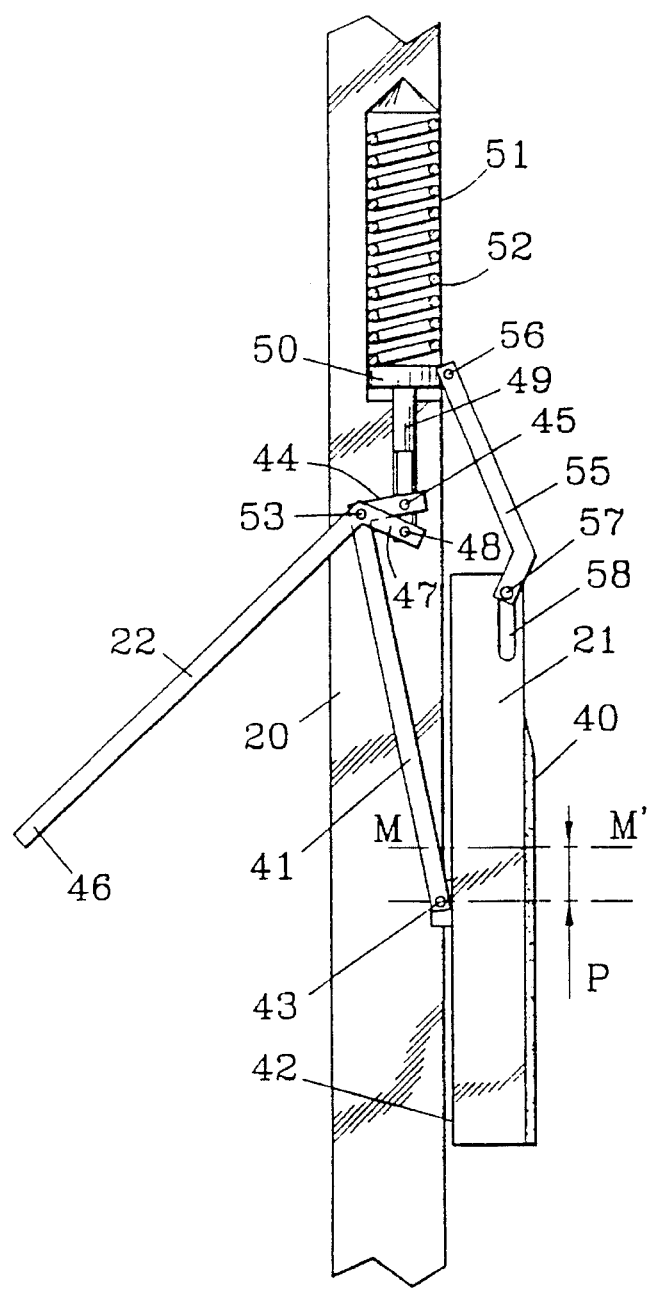
FIG. 1 is a diagrammatic side view of a tool of the invention carrying a measurement pad.

The logging tool shown in FIG. 1 is designed to be lowered down a borehole by means of a transmission cable. In conventional manner, the cable is connected to surface equipment (not shown) including, in particular, a winch and means for recording and processing the measurement data produced by the logging device and transmitted by the cable.

The gamma type logging tool comprises a measurement pad 21 whose face designed for contact with the wall of the borehole is given reference 40. The pad 21 is connected to the body of the tool by an arm 41.

Mechanical means of conventional type that are not described herein are provided for moving the pad 21 relative to the body of the sonde in order to press the pad against the wall of the borehole, and in such a manner as to ensure satisfactory contact of the pad 21 against the wall of the borehole under various operating conditions resulting from the varied geometrical shapes of borehole walls.

A preferred embodiment of the pad 21 is described below with reference to FIGS. 2 and 3, this pad comprising means suitable for providing a measurement of the density of formations, and of other characteristics such as the photoelectric absorption factor Pe. These means include a gamma ray source 80 and three gamma detectors 81, 82, and 83 in alignment with the source 80 along the longitudinal axis of the pad, and all situated on the same side of the source. In a preferred example, the three detectors include a near detector 81, a far detector 82, and a backscattering detector 83 which is placed in the immediate proximity of the source 80, these three detectors being identified in FIG. 2 by the windows 71, 72, and 73 respectively associated therewith. The backscattering detector 83 is characterized by a nonnegative response to increasing density of the formation, unlike the near detector 81 and the far detector 82 which are both attenuation detectors having a negative response to an increase in density.

Although the description below refers to a tool that uses a backscattering detector and two attenuation detectors, the invention is naturally not limited to this particular implementation.

The face 40 designed for making contact with the wall of the borehole is preferably in the shape of a sector of a cylinder.

The main structural element of the pad 21 comprises a generally cylindrical housing that withstands pressure, e.g.

made of stainless steel. The three gamma detectors 81, 82, and 83 are located inside the housing.

Appropriate detectors are photoscintillators of the NaI or GSO (gadolinium orthosilicate) type. Each of the detectors 81, 82, and 83 is associated with a respective assembly 111, 112, or 113 comprising a photomultiplier, a high tension power supply with its control circuit, and a preamplifier circuit.

The gamma ray source 80 is typically a cesium 137 source placed at the bottom end of the pad, outside the housing and including its own pressure-withstanding case.

The detectors 81, 82, and 83 are protected from unwanted gamma rays (i.e. rays that have not interacted with the formation), and in particular rays arriving directly, by shielding made of material having high gamma ray absorption power (e.g. tungsten or depleted uranium). Thus, a shielding element 119 in the form of a sector of a cylinder overlies the housing in the bottom portion of the pad, the element 119 having openings that form the windows 70 (for the source), 71 (for the near detector), and 73 (for the backscattering detector). This element also includes an end portion 120 extending beyond the source 80 and thus constituting the bottom end of the pad, thereby minimizing gamma ray flux into the drilling fluid. At its opposite end, the element 119 has a portion 121 that extends well beyond the window 71 for the near detector 81. A shielding element 122 is placed on the outside of the housing level with the far detector 82 and it includes an opening that forms the window 72. Other shielding elements (not shown) are also provided, each surrounding a corresponding detector.

The inside volume of the housing may receive electronic components or cards.

The tool-forming pad 21 is pressed in the manner described above against the wall of the borehole which is covered by a thickness of mudcake given reference 130, while the formations are given reference 140.

Figure 2:
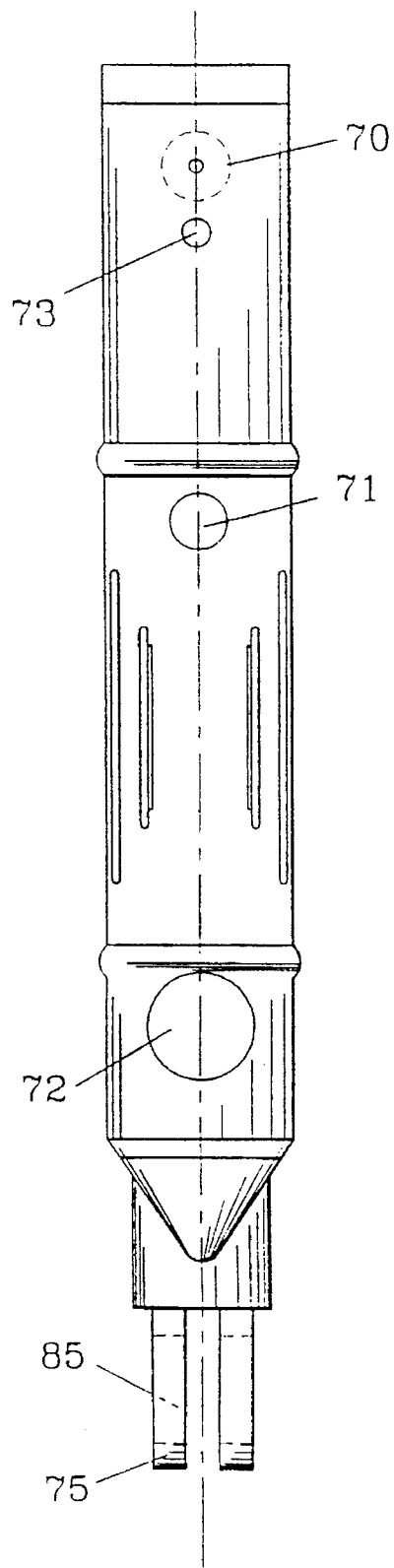
FIG. 2 is a view of the contact face of the measurement pad.

The person skilled in the art will find from above-specified patent application No. 93 11896, e.g. FIGS. 2, 3A, and 3B thereof, further information, in particular concerning the known elements mentioned above but not shown in the drawing.

Figure 3:
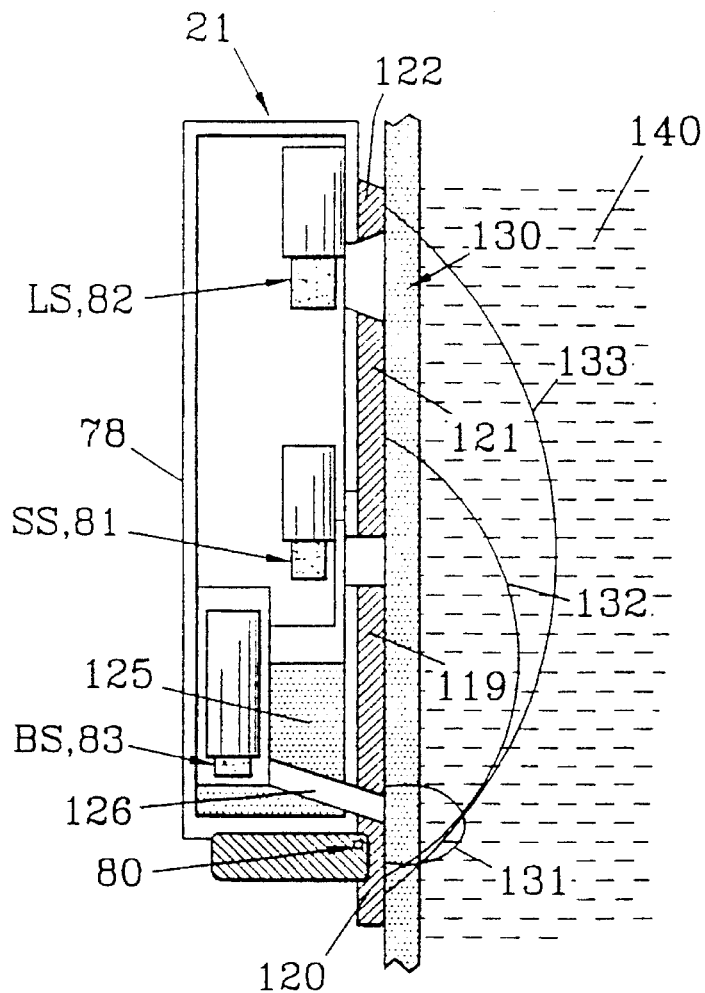
FIG. 3 is a diagrammatic longitudinal section through the pad placed against the wall of a borehole.

Curved lines in FIG. 3 constituting portions of ellipses or circles symbolize the investigation zones that correspond to the various detectors. In other words, each of the curves referenced 131, 132, and 133 corresponds respectively to the backscattering detector 83, to the near attenuation detector 81, and to the far attenuation detector 82.

It should be observed that the further a detector is from the source, the greater the radius of curvature of the corresponding curve; the further the detector is from the source, the greater the distance of the distal point of the corresponding curve from the pad 21; and the greater said distance, the greater the investigation depth of the corresponding detector.

Figure 4:
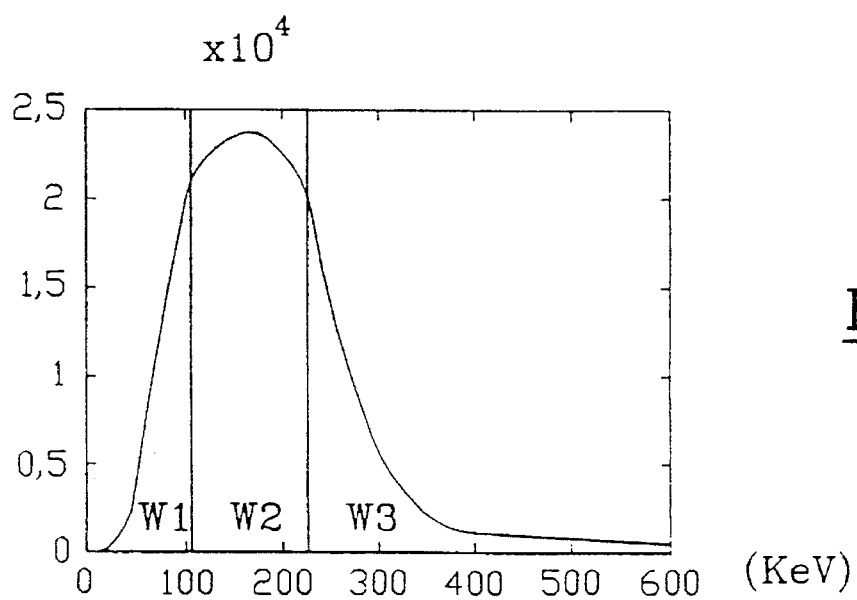
FIG. 4 shows an example of an energy spectrum.

FIG. 4 is a diagram showing one example of an energy spectrum by plotting number of detected particles (count rates) as a function of energy expressed in keV. The curve has a maximum at around 150 keV. The spectrum is subdivided into three windows W1, W2, and W3, running respectively from 0 to 100 keV, from 100 keV to 220 keV, and from 220 keV to 600 keV.

The detected particles present respective given energies, and in statistical terms they are representative of specific interaction phenomena between the gamma particles or photons emitted by the source and atoms in the formation or the mudcake, depending on the spectrum band in which they lie. Two main interactions take place, namely Compton diffusion (representative of density rho) and a "photoelectric interaction" (representative of Pe).

The measurement tool is lowered to the bottom of the borehole and it is raised towards the surface in continuous manner. At each depth level, a measurement is taken, i.e. the source emits radiation during a given time interval which is generally very short, and for each detector the number of photons that have interacted with the formation and with the mudcake is detected and counted. The count rate is then expressed for each detector as a function of the energy of each gamma particle or photon, so as to obtain spectra of the type shown in FIG. 4.

For reasons of convenience, the detectors are referred to in the description below by means of a two-letter code, as follows:

near attenuation detector 81: SS;

far attenuation detector 82: LS;

backscattering detector 83: BS.

The number of energy windows into which each spectrum is subdivided may differ and may be adapted to the corresponding detector. Thus, for example, the energy spectrum of the backscattering detector BS is subdivided into three windows, whereas the energy spectra from the near and far direct detectors SS and LS respectively are subdivided into four windows, over ranges given below, by way of example, and expressed in keV:

BS: [50, 130] [140, 210] [220, 350]

SS: [50, 100] [110, 150] [160, 220] [230, 350]

LS: [40, 80] [90, 180] [190, 240] [250, 540]

A measurement is made up of data expressed in the form of a vector Wnm, where the subscript "n" corresponds to each depth level, and where the superscript "m" symbolizes the measurement:

$$W_n^m = (W_{1,n}^{BS}, W_{2,n}^{BS}, W_{3,n}^{BS}, W_{1,n}^{SS}, \ldots, W_{4,n}^{SS}, W_{1,n}^{LS}, \ldots W_{4,n}^{LS})$$

where the indices 1, 2, 3, 4 correspond to respective energy windows W1, W2, W3, W4.

Thus, at a given depth level $\underline{n}$, a series of measurements are performed for each of the energy windows and for each detector.

Figure 5:
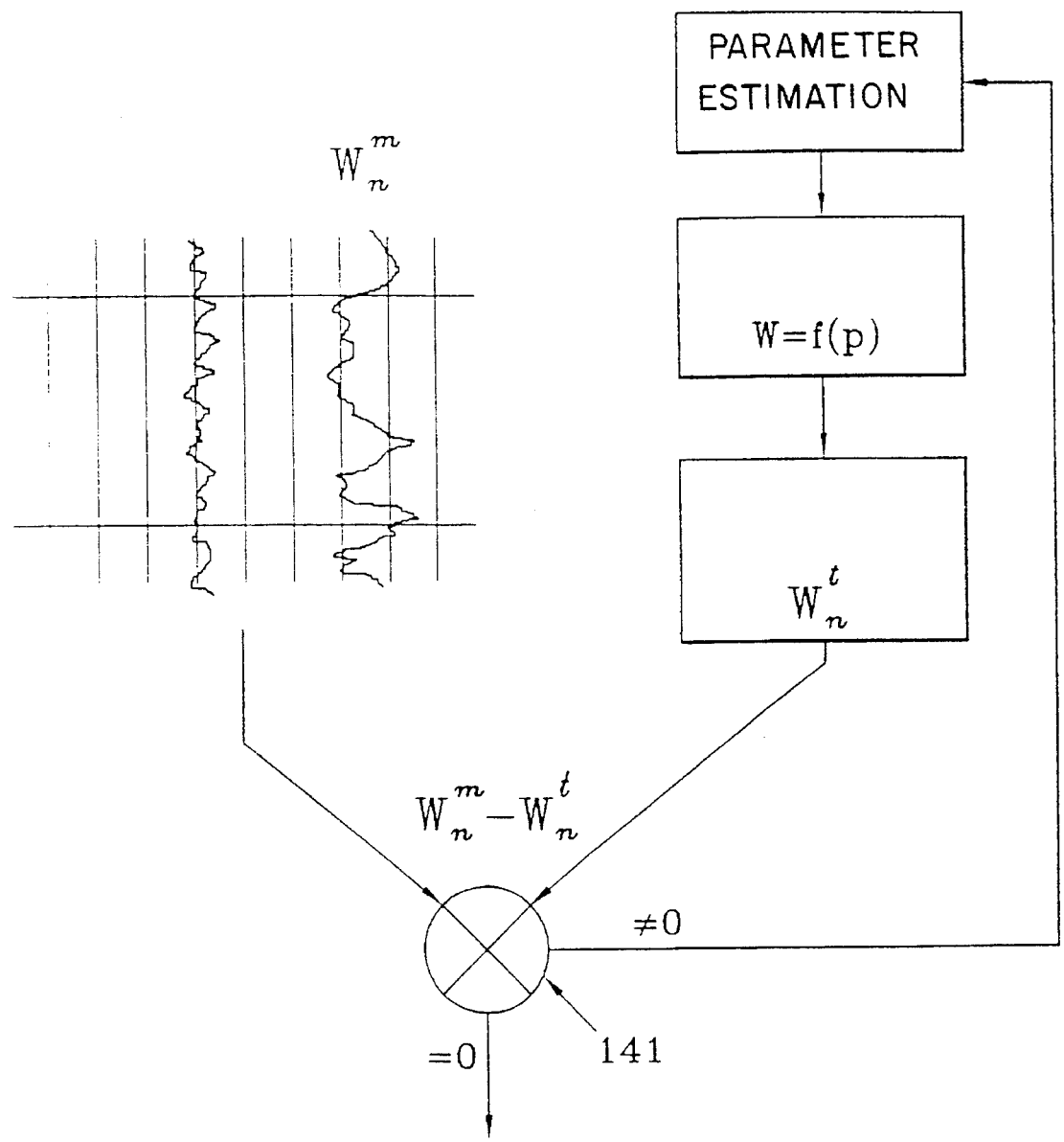
FIG. 5 is a simplified flow chart of the step in the method of the invention in which a minimum is sought.

Schematically, with reference to FIG. 5, a direct theoretical model is created, i.e. a model representing the measurements $W_n^m$ as a function $\underline{f}$ of the looked-for parameter $P_n$:

$$W_n^m = f(p_n)$$

Thereafter, a value of the parameter is determined such that, when applied to the above function $\underline{f}$ of the theoretical model, it gives rise to the following equality or near equality:

$$W_n^t = W_n^m$$

where $W_n^m$ is the real measured value and $W_n^t$ is the calculated estimated value.

This comparison is performed by functional block 141 of FIG. 5 where $W_n^m$ is compared with $W_n^t$ as calculated theoretically using the mathematical model represented by the function $\underline{f}$.

When the difference between $W_n^m$ and $W_n^t$ is zero or minimal, the corresponding parameter $\underline{p}$ is stored and marked on a curve showing how said parameter varies as a function of depth, which curve is called a log and is shown diagrammatically in FIG. 5.

There follows a description in detail of the mathematical model in the form of a function giving the variations in the measurements (i.e. the numbers of particles detected as a function of energy) as a function of the looked-for parameter. It should be observed that the term "looked-for" parameter is used to designate the mathematical unknown. Thus, it is possible to look for five parameters or unknowns, namely:

rho=the density of the formation
Pe=the photoelectric absorption factor of the formation
$rho_m$=the density of the mudcake
$Pe_m$=the photoelectric absorption factor of the mudcake
$h_{mc}$=the thickness of the mudcake.

The direct model is designed to represent the interactions between the emitted particles and the atoms of the geological formation and of the mudcake in a manner that is as close as possible to reality. The model is based on the assumption that the thickness of the mudcake remains constant over the length of the tool (pad) and is less than 4 cm, and that over said length its properties remain constant.

In practice, the model is determined by measurements using a reference tool that includes detectors whose response is known accurately, the tool being calibrated in reference blocks whose lithological, geological and other characteristics are accurately known. To improve the model, it is subjected to mathematical constraints in the form of limit conditions such as, for example, for a mudcake of so-called "infinite" thickness the model must produce a density value for the formation which is equal to the density of the mudcake. Similarly, when the formation and the mudcake present the same characteristics, there must be no variation in the radial direction in the response of the detectors relative to a variation in the thickness of the mudcake.

The following mathematical expressions represent examples of theoretical models for each type of detector.

Detector BS for energy window "k":

$$f^{BS}=[\alpha_1 \rho e^{(-\alpha_2 \rho - \alpha_3 \rho Pe - \alpha_4 h_{me}(\rho_m - \rho))-\alpha_5(\rho_m Pe_m - \rho Pe) \div \alpha_6}]$$
$$(1 \div \alpha_7 h_{me} \div \alpha_8 h_{me}^2) \div \alpha_9 h_{me} \div \alpha_{10} h_{me}^2 \div \alpha_{11} \rho_{me} \div \alpha_{12}(\rho_m h_{me})^2 \div \alpha_{13} \rho_m Pe_m h_{me} + tm \quad (1)$$

Detectors SS and LS for energy window "k":

$$g^{SS}, h^{LS} = b_1 e^{(-b_2 \rho - b_3 \rho Pe - b_4 h_{me}(\rho_m - \rho)) - b_5 h_{mc}(\rho_m Pe_m - \rho Pe)} (1 \div b_6 h_{me} \div b_7 h_{me}^2) \div b_8 \div b_9 h_{me} \div b_{10} h_{me}^2 \div b_{11} h_{me} \rho_m \div b_{12} (\rho_m h_{me})^2 + tm \quad (2)$$

where $a_i$ and $b_i$ are constants defined for each energy window "k", by using the calibration method described below.

It should be observed that the parameter "r" corresponds to and is equivalent to the parameter called "rho" in the text of the present application.

The index "i" of the constants $a_i$ lies in the range 1 to 13 in above equation (1), while the index "i" of the constants $b_i$ lies in the range 1 to 12 in above equation (2).

Above equation (2) represents an example of a model firstly for the detector SS and secondly for the detector LS.

The constants $b_i$ for the model of the detector SS, i.e. the function $g^{SS}$ are different from the constants $b_i$ for the model of the detector LS, i.e. the function $h^{LS}$.

Thus, for each energy window "k", the function representative of the model for the detector BS has a set of thirteen constants $a_i$, a set of twelve constants $b_i$ for the model of the detector SS, and another set of twelve constants $b_i$ for the model of the detector LS. Given the number of energy windows allocated to each detector, as explained above, each function is associated, at each depth, and thus for each measurement, with the following numbers of constants:

detector BS: 13×3=39 constants $a_i$
detector SS: 12×4=48 constants $b_i$
detector LS: 12×4=48 constants $b_i$ Each energy window "k" corresponds to its own model.

The parameters $a_i$ and $b_i$ of the above models are calculated by causing the parameters of the above-mentioned reference blocks to vary, e.g. over the following ranges:

| | | |
|---|---|---|
| formations: | $1.7 \leq rho \leq 3$ g/cm3 | $1.3 \leq Pe \leq 5.1$ |
| mudcake: | $1 \leq rho_m \leq 2.3$ g/cm3 | $0.35 \leq Pe_m \leq 15$ |
| mudcake thickness: | $0 \leq h_{mc} \leq 4$ cm | |

Figure 6:
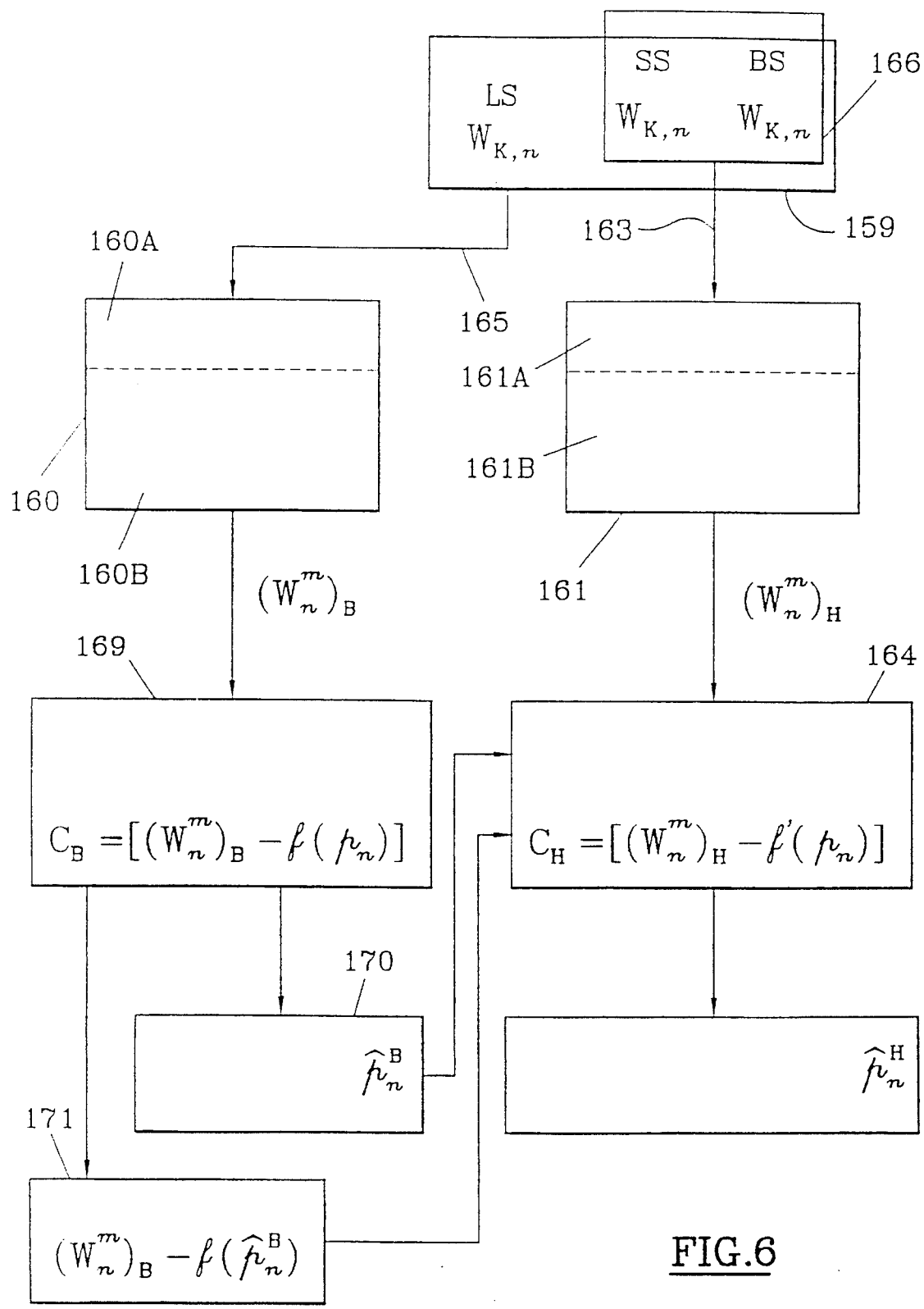
FIG. 6 is a simplified flow chart of the method of the invention.

With reference to FIG. 6, the measurements $W_n^m$ are represented in functional block 159 by the components of the vector $W_n^m$ where the index "k" corresponds to a given energy window, and where the index "n" corresponds to a given depth level.

The measurements $W_n^m$ are subjected to two types of calculation represented by two functional branches stemming from functional block 159 incorporating the measurement component $W_n^m$ for each detector.

In a first branch 163, called the "high resolution" branch, the measurements $(W_n^m)_H$ coming from the two detectors BS and SS of sub-block 166 of main block 159 are subjected to preprocessing operations (block 161) including filtering 161A, and high resolution calibration 161B, described in detail below.

The index H represents and refers to high resolution.

The preprocessed data $(W_n^m)_H$ from the block 161 is subsequently subjected (block 164) to a step of searching for the minimum of a function $C_H$ which is representative of the difference between the measurements $(W_n^m)^H$ and the theoretical values $(W_n^t)^H = f(p_n^H)$ calculated using the corresponding models such as those given in equations 1 and 2.

This search for a minimum is performed by iteration, for each depth and for all of the energy windows of all of the detectors concerned. In other words, values for the parameters pn are applied to the corresponding model so as to minimize the difference between the measurements $(W_n^m)^H$ and the values $W_n^t = f(p_n^H)$ calculated from the model.

This search for minima in the function $C_H$ is expressed mathematically as a search for minima in the least squares sense in the square of the difference C between $(W_n^m)_H$ and $f(p_n^H)$, expressed mathematically as follows:

$$C = \|(W_n^m)^H - f(p_n^H)\|_R^2 \quad (4)$$

where R is the error covariance matrix, meaning that each term is weighted.

The difference between the calculated values and the real measured values is minimized by iterating while modifying the values of the parameter $P_n$, and is done in each energy window k (k=1, 2, 3, 4 preferably). Similarly, the calculation is performed for each depth level n.

In a second branch of the calculation, referred to as the "low resolution" branch and given reference 165 in FIG. 6, all of the measurements $W_n^m$ from all three detectors are used, and this is done for each depth and for each energy window. The measurements from the three detectors are subjected to a preprocessing step (block 160) including a filtering step 160A and a low resolution calibration step 160B described in detail below.

The index B represents low resolution.

After preprocessing (block 160), the low resolution measurements $(W_n^m)_B$ are subjected to a step (169) of searching for the minimum in a function $C_B$ representative of the difference between the low resolution measurements $(W_n^m)_B$ and the theoretical values $(W_n^t)_B = f(p_n^B)$ calculated using the corresponding models such as those given by equations 1, and 2.

Parameter values are sought by successive iterations such that when applied to the corresponding models they minimize the difference between the measured values $(W_n^m)_B$ and the calculated values $(W_n^t)_B = f(p_n^B)$.

The search for minima can be performed by any known least squares technique.

The step of searching for low resolution minima (block 169) serves to determine firstly low resolution parameters (block 170) and secondly "measurement bias" values (block 171).

The low resolution parameters $p_n^B$ (from block 170) thus correspond to parameters which, when applied to the model, serve to minimize the difference between the real measurements and the measurements calculated on the basis of the models.

Mathematically speaking, the measurement bias corresponds to the difference between the measured values $W_n^m$ and the theoretical values $W_n^t$. In other words, the measurement bias corresponds to the looked-for minimum of the function C and is equal to: $(W_n^m)_B = f(p_n^B)$.

The difference between the measurements and the theoretical values is not exactly equal to zero. The measurement bias represents errors of measurement, in the model, or due to any other phenomena that are difficult or impossible to control and that may affect the measurements or the calculations. This measurement bias is also known as "reconstruction error" since the direct model method seeks to "reconstruct" the measurements on the basis of a mathematical model.

It can be seen that the calculations in the high resolution branch 163 and in the low resolution branch 165 are performed in parallel.

The sampling rate (frequency of measurements) is selected to be relatively high for the high resolution measurements. In other words, the number of measurements taken per unit time is relatively large. This is equivalent to performing numerous measurements per unit length in the borehole, since the tool is being raised towards the surface while the measurements are being taken. The difference between high and low resolution makes it possible to use different sampling rates for the measurements intended for the high and low resolution branches respectively of the calculation. In practice, measurements are taken at a given sampling rate for all three detectors, and at low resolution (all three detectors) only a fraction of the measurements taken are used, i.e. the measurements are used at a sampling rate that is smaller than that used for high resolution (the two detectors BS and SS).

Measurement resolution decreases with increasing distance between the source and the corresponding detector. Thus, in theory, the detector BS is capable of giving high resolution measurements (about 5 cm), whereas in theory the theory SS gives medium resolution measurements (about 20 cm), and finally the detector LS provides low resolution measurements (about 40 cm).

Figure 7:
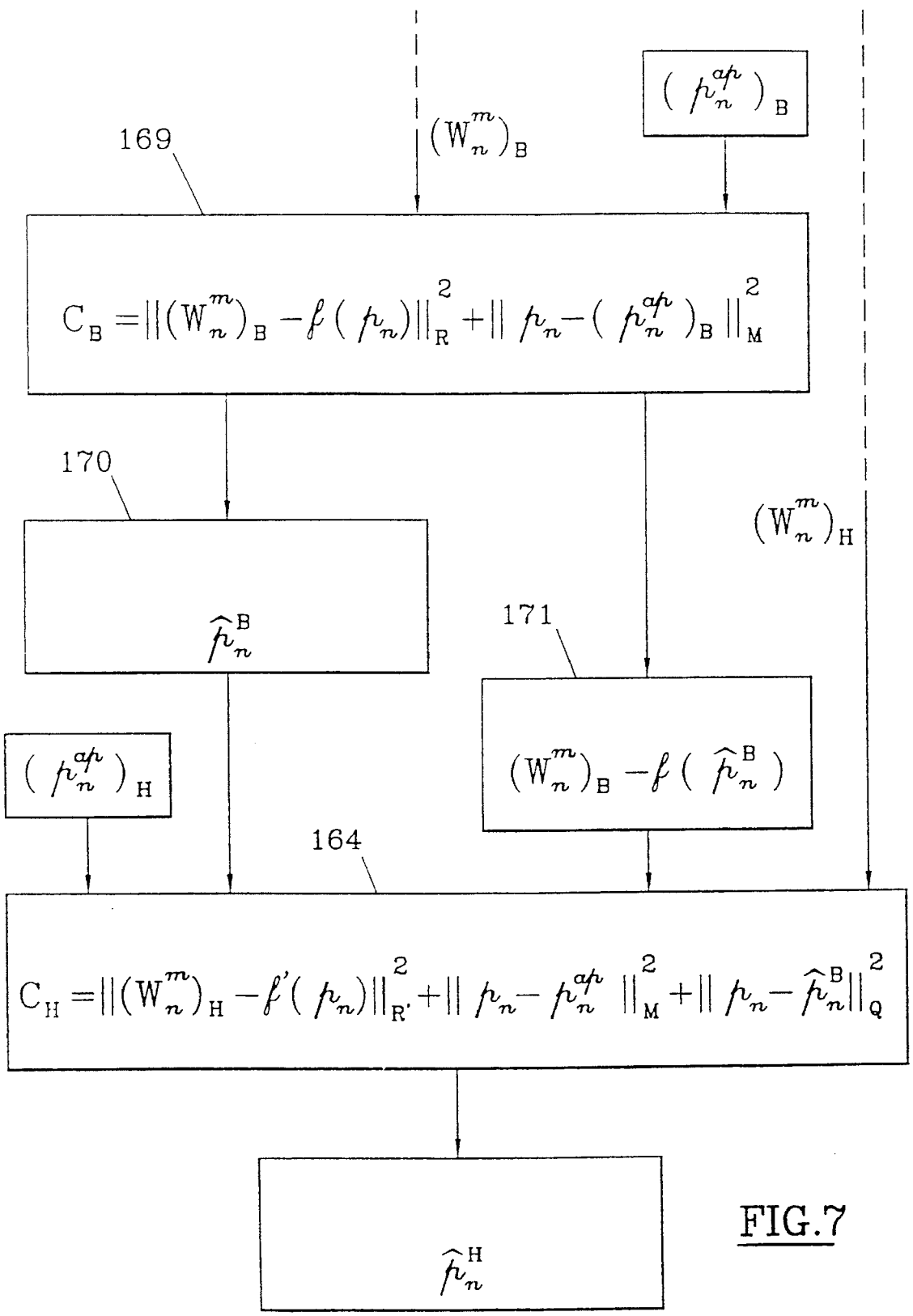
FIG. 7 is a fragmentary flow chart showing in detail the steps involved in seeking the minimum.

The steps of searching for minima in the functions $C_B$ (low resolution 165) and $C_H$ (high resolution 163) are described in greater detail below with reference to FIG. 7.

The following description is equally applicable to low resolution and to high resolution, other things being equal. As a result, the mathematical symbols are not given indices B or H.

The general expression of the difference:

$$W_n^m = f(p_n)$$

is given in vector terms (for low resolution), as follows:

$$\begin{pmatrix} Wk,n^{BS} \\ Wk,n^{SS} \\ Wk,n^{LS} \end{pmatrix} - \begin{pmatrix} fk(p) \\ gk(p) \\ hk(p) \end{pmatrix} \quad (5)$$

The function $f_k$ corresponds to the model for window $\underline{k}$ of detector BS (see equation 1), while the functions $g_k$ and $h_k$ correspond to the models for the windows for the near and far detectors SS and LS (see equation 2).

Firstly, during the steps of seeking minima respectively in the low resolution branch (block 169) and in the high resolution branch (block 164) for the purpose of minimizing the difference between the measurements and the values as calculated on the basis of the models, each window is weighted as a function of the error associated with said window and of the error of the model.

In mathematical terms, this weighting is as follows:

$$C = \|W_n^m - f(p)\|_R^2$$

$$C = [W_n^m - f(p_n)]^T \quad R^{-1} [W_n^m - f(p_n)]$$

$$R = \begin{pmatrix} \sigma^B w1 & 0 \\ 0 & \sigma^2 wi \end{pmatrix}$$

where $\sigma^2 wi$ is total error variance and equal to:

$$\sigma^2 wi = (\sigma wi)^2 m + (\sigma wi)^2 t$$

where the index "i" corresponds to energy window "i"; where $(\sigma wi)^2 m$ is the error variance in the measurement associated with counting; and $(\sigma wi)^2 t$ is the error variance in the model (as estimated when establishing the model).

C is thus minimized as follows:

$$C = \Sigma [Wn,i^m - fi(pn)]^2 / \sigma wi^2$$

where $\underline{i}$ is the number of windows, i=1, ..., n with n=11.

The greater the term $\sigma$, the less the contribution of that window in the step of searching for a minimum in C; in other words, the weight given to said window is small.

As mentioned above, the models are different for each window and for each detector. By resolving the error variance as given above into a sum of two variances, it is possible to take account of error in the model. In other words, the demands in the mathematical sense of the search for a minimum between the measured value $W_n^m$ and the theoretical value $f(p)$ increase with increasing reliability in $W_n^m$ and in the model.

The method of the invention also makes it possible to monitor the stability in the mathematical sense of the calculations performed so as to prevent the search for a minimum between the measured values and the theoretical values leading to a divergent solution. To do this, the factor C representing the difference between the measured values and the theoretical values has a component added thereto of the following form:

$$\|p_n - p_n^{ap}\|_M^2$$

where $p_n^{ap}$ is an imposed solution that is known a priori or that is determined empirically, such that the calculated solution (enabling the factor C to be minimized) leads to a solution that differs little from the imposed solution. p is expressed in the form of a vector whose components are the five unknowns. M is a matrix representing the weighting given to $p_n^{ap}$.

Another improvement to the calculations consists in reducing the systematic error in BS and SS or "measurement bias" that would otherwise cause the factor $C_B$ to be minimized to be systematically equal to zero in the "low resolution" inversion.

On the basis of the "low resolution" inversion calculations, the measurement bias of the detectors BS and SS is estimated in order to correct the corresponding bias.

The minimum value of $C_B$ in the overall sense and as calculated by the vectors, is determined for each window and corresponds to the sum of the squares of the biases that result from the difference between the measurements $(W_n^m)_B$ and the corresponding model (see equation 1 or 2). It is assumed that bias error varies little with depth and little with time.

The calculated low resolution parameters are used in the high resolution step (block 164) of searching for a minimum by adding a term:

$$\|p_n - p_n^B\|_Q^2$$

where Q is a weighting matrix.

This makes it possible to correct the bias of the detectors SS and BS which may be quite large for the high resolution measurements $(W_n^m)_H$.

The search for a minimum in the function $C_H$ (block 164 in the high resolution branch 163$)_H$ is performed on the preprocessed measurements $(W_n^m)$ from the block 161 and also using the low resolution parameters $p_n^B$ (block 170) together with the measurement bias (block 171).

With further reference to FIG. 6, there follows a description of the steps in which resolution is calibrated (also known as "resolution matching"), seeking to establish correspondence between the measurements from the various detectors, while taking account of their respective resolutions and of their respective longitudinal offsets relative to the source.

For the very near detector BS and the near detector SS, resolution calibration consists in averaging the responses from the detector over a sliding window of given length. Thus, for the "high resolution" measurements, the responses of the very near detector BS are averaged over the distance between the source and the near detector. For the "low resolution" measurements, the responses from the very near detector BS and the responses from the near detector LS are averaged over the distance between the source and the far detector. The average of the measurements from the detector BS (in high resolution) gives a measurement that is substantially equivalent (ignoring investigation depth) to the measurement from the detector SS since the investigation zone is substantially common, at least in height (measured in the longitudinal direction of the borehole).

Calibration is equivalent to calibration in spatial frequency. For example, in "high resolution" this amounts in other words to "degrading" the response curve of the detector BS (count rate as a function of depth in the borehole) to make it correspond to that of the detector SS.

The invention is not limited to the embodiment described, but on the contrary includes all variants covered by the following claims.

We claim:

1. A method of determining at least one parameter representative of a physical characteristic of geological formations having a borehole passing therethrough, by means of a logging tool or sonde suitable for being lowered down the borehole at the end of a cable, in which the formations are irradiated by a gamma ray source, and photons that have interacted with the formations are detected and counted in a plurality of energy windows by three detectors that are longitudinally offset relative to the source, comprising a very near detector, a near detector, and a far detector, the method being characterized by the following steps:

a) creating, for each energy window, a model that is characteristic of a response of each detector;

b) combining measurements coming from the three detectors to constitute a "low resolution" real measurement;

c) determining a "low resolution" value of the parameter such that, when applied to the model, it gives rise to a theoretical measurement that is equal to or substantially equal to the "low resolution" real measurement;

d) combining the measurements from the two detectors closest to the source to constitute a "high resolution" real measurement; and e) determining a "high resolution" value of the parameter on the basis of the "high resolution" real measurement and the "low resolution" value of the parameter, such that when the determined "high resolution" value is applied to the model, it gives rise to a theoretical value that is equal or substantially equal to the "high resolution" real measurement.

2. A method according to claim 1, wherein the very near detector comprises a backscattering detector and the near and far detectors comprise two attenuation detectors.

3. A method according to claim 1, further comprising the step of performing resolution calibration by averaging "low resolution" measurements coming from the very near detector over a total longitudinal distance that corresponds to a distance between the source and the near detector.

4. A method according to claim 3, wherein the high resolution value of the parameter is determined, by application to the model, by minimizing in the least squared sense the difference between the theoretical calculated measurements and the real measurements.

5. A method according to claim 1, wherein the high resolution measurements from the near detector are averaged over a depth corresponding to a distance between the source and the far detector.

6. A method according to claim 5, wherein the high resolution value of the parameter is determined, by application to the model, by minimizing in the least squared sense the difference between the theoretical calculated measurements and the real measurements.

7. A method according to claim 1, wherein an energy spectrum of each detector is subdivided into a plurality of contiguous energy windows and that each energy window is associated with a corresponding theoretical model.

8. A method according to claim 7, wherein each window is weighted as a function of an error given to said window and an error given to the corresponding model.

9. Apparatus for determining at least one parameter representative of a physical characteristic of geological formations having a borehole passing therethrough, comprising:

a) a logging tool or sonde suitable for being lowered down said borehole at the end of a cable;

b) a source of gamma radiation for irradiating the formations;

c) three detectors that are longitudinally offset from the source for detecting photons that have interacted with the formations and counting photons in a plurality of energy windows, namely a very near detector, a near detector, and a far detector;

d) means for creating, for each energy window, a model characteristic of the response of each detector;

e) means for combining measurements from all three detectors to constitute a "low resolution" real measurement;

f) means for determining a "low resolution" value of the parameter which, applied to the model, gives rise to a theoretical measurement equal or substantially equal to the "low resolution" real measurement;

g) means for combining the measurements from the two detectors closest to the source to constitute a "high resolution" real measurement; and h) means for determining a "high resolution" value of the parameter based on the "high resolution" real measurement and on the value of the "low resolution" parameter, which, when applied to the model, gives rise to a theoretical value that is equal or substantially equal to the "high resolution" real measurement.

10. Apparatus according to claim 9, wherein the very near detector is a backscattering detector and the near and far detectors are both attenuation detectors.

11. Apparatus according to claim 9, further comprising means for calibrating resolution by averaging measurements from the very near detector over a total longitudinal distance corresponding to a distance between the source and the near detector.

12. Apparatus according to claim 9, further comprising means for averaging measurements from the near detector over a depth corresponding to a distance between the source and the far detector.

13. Apparatus according to claim 9, wherein the means for determining the high resolution value of the parameter minimizes in the least squares sense the difference between theoretical calculated measurements and the real measurements.

14. Apparatus according to claim 9, wherein each detector has an energy spectrum which is subdivided into a plurality of contiguous energy windows, each energy window being associated with a corresponding theoretical model.

15. Apparatus according to claim 14, wherein each window is weighted as a function of an error given to said window and of an error given to the corresponding model.

16. A method of characterizing an underground formation surrounding a borehole, comprising the steps of:

a) irradiating the formation with a gamma ray source;

b) detecting photons that have interacted with the formation are detected and counting photons in a plurality of energy windows using three detectors that are longitudinally offset relative to the source, comprising a very near detector, a near detector, and a far detector;

c) creating, for each energy window, a model that is characteristic of a response of each detector;

d) combining measurements coming from the three detectors to constitute a "low resolution" real measurement;

e) determining a "low resolution" value of the parameter such that, when applied to the model, it gives rise to a theoretical measurement that is equal to or substantially equal to the "low resolution" real measurement;

f) combining the measurements from the two detectors closest to the source to constitute a "high resolution" real measurement; and g) determining a "high resolution" value of the parameter on the basis of the "high resolution" real measurement and the "low resolution" value of the parameter, such that when the determined "high resolution" value is applied to the model, it gives rise to a theoretical value that is equal or substantially equal to the "high resolution" real measurement.

17. A method according to claim 16, further comprising the step of performing resolution calibration by averaging "low resolution" measurements coming from the very near detector over a total longitudinal distance that corresponds to a distance between the source and the near detector.

18. A method according to claim 16, wherein the high resolution measurements from the near detector are averaged over a depth corresponding to a distance between the source and the far detector.

19. A method according to claim 18, wherein the high resolution value of the parameter is determined, by application to the model, by minimizing in the least squared sense the difference between the theoretical calculated measurements and the real measurements.

20. A method according to claim 16, further comprising the step of subdividing an energy spectrum of each detector into a plurality of contiguous energy windows, each of which is weighted as a function of an error given to said window and an error given to a corresponding model.

* * * * *